March 21, 1961 S. HIRSCH 2,975,896
HYDROCYCLONE FOR FIBRES SUSPENSION
Filed Aug. 17, 1959 2 Sheets-Sheet 1

INVENTOR:
Siegfried Hirsch
By: KENWAY, JENNEY, WITTER & HILDRETH

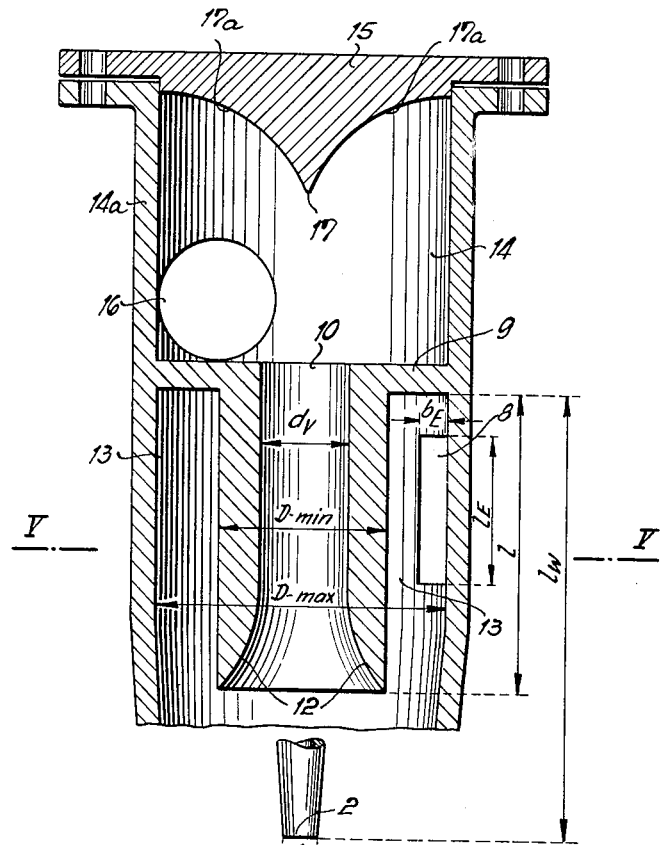

United States Patent Office 2,975,896
Patented Mar. 21, 1961

2,975,896

HYDROCYCLONE FOR FIBRES SUSPENSION

Siegfried Hirsch, Eickelgasse 18, Karlsruhe-Durlach, Baden, Germany

Filed Aug. 17, 1959, Ser. No. 834,156

4 Claims. (Cl. 209—211)

This invention relates to hydrocyclones of the type employed for separating solid impurities from suspensions such as paper pulp and the like.

In general, a hydrocyclone of the type to which this invention relates consists of an elongated chamber having an inner surface of circular section, the upper portion being generally cyclindrical and forming an initial whirl chamber, and the lower portion being conical and merging at its wide end with the initial whirl chamber. An inlet opening in the wall of the initial whirl chamber provides for the tangential introduction of a fluid to be treated, and clean product is withdrawn from the center of the upper end of the conical portion by means of an outlet tube, generally referred to as the vortex finder, which projects axially inwardly through the initial whirl chamber. Impurities are withdrawn from an opening at the apex of the conical portion.

Separation of impurities from a fluid is effected by introducing the fluid through the inlet at high velocity to cause it to whirl rapidly in the initial whirl chamber. From there it flows in a continuously whirling stream downwardly along the conical wall of the lower section, in a path of ever decreasing radius and at ever increasing velocity. The centrifugal forces thus created cause outward motion of particles by an amount dependent on their specific gravity, shape, and dimensions. Impurities susceptible to segregation by this centrifugal force are thus thrown outwardly toward the wall of the conical portion and ultimately collect in the bottom from where they are discharged in the opening in the apex. As the whirling stream approaches the bottom conical portion, it is constrained to flow inwardly toward the center and thence upwardly and out through the vortex finder tube. A stream of air or vapor, which is drawn in through the apex opening, is generally located at the center of the whirling mass and flows along with the outgoing stream of fluid through the vortex finder tube. Preferably only a relatively small fraction of the total fluid is removed through the apex opening.

The effectiveness of separation within a hydrocyclone depends on many factors including not only the magnitude of the centrifical forces developed but also the degree to which the incoming impure stream is physically separated from the outgoing purified stream and the degree to which turbulence and other types of disruptive flow patterns within the unit impair the separation. Of great importance is the efficiency with which the energy of the incoming stream is utilized to produce forces effective for separation.

Since the whirling cyclonic stream is developed only by the energy of the stream entering the initial whirl space tangentially and cyclonic motion continues only to the extent that the whirling motion initially developed is maintained throughout the course of flow, first downwardly into the conical portion of the chamber, then inwardly, and finally upwardly at the center of the conical portion, it is quite important that the flow conditions within the chamber be such as not to impair or disrupt this flow path.

The present invention provides a hydrocyclone of an improved construction which permits separations of greater efficiency than heretofore realized, particularly in such operations as the purification of paper pulp wherein the impurities are frequently of practically the same density as the fiber, and are moreover physically entwined within the fibers. Specific improvements that may be realized over hydrocyclones heretofore available include a lower total volume of waste stream, but actually containing a larger total amount of waste solids. The invention further provides a larger apex opening for a given operation (notwithstanding the lower fraction withdrawn through it) and thereby permits removal or separation of larger particles of impurities than would otherwise be feasible.

By way of comparison with a hydrocyclone which is typical of those heretofore known, such as for instance one described in U.S. Patent No. 2,377,524, a given device as heretofore known would require for the removal of 60–95 percent of the impurities from paper pulp, an apex opening 4–5 millimeters in diameter and a withdrawal of 5–6 percent of the stock containing 10–20 percent of the incoming pure fibers. For the same degree of separation a comparable hydrocyclone constructed in accordance with this invention may employ an apex opening of 7 millimeters through which only 1–4 percent of the stock is withdrawn containing only 5–7 percent of the incoming pure fibers. The improvement realized by this invention can also be seen by comparing units constructed with the same apex opening. A prior art device having an apex opening of 7 millimeters in diameter would require the withdrawal from the apex of 23.5 percent of the stock to produce a given purity of the final product whereas a comparable unit constructed in accordance with the principles of this invention, also having an apex opening of 7 millimeters in diameter would require the withdrawal of only about 8 percent of the total stock to achieve the same degree of purification.

This invention is in general characterized by utilizing dimensions such that the volume or mass of fluid flowing downwardly in the zone adjacent the walls of the conical portion is of the same order of magnitude as that in the initial whirl space and is also of the same order of magnitude as that in the transition zone wherein the fluid changes from downwardly flowing to upwardly flowing, and as that of the outgoing stream of upwardly flowing fluid. The maintenance of these relationships has been found to result in greater separation efficiencies, believed to be caused partly by more efficient utilization of the energy of the incoming stream and partly by the greatly enlarged transition zone and the resulting relatively large separation of the upwardly flowing outgoing stream from the downwardly flowing stream entering the conical portion.

This invention can best be understood by reference to a specific preferred embodiment which is described in detail below and illustrated in the accompanying drawing, in which Fig. 1 shows a hydrocyclone constructed in accordance with this invention, in longitudinal cross section;

Fig. 4 is a longitudinal section showing in detail the construction of the upper portion and the apex of the embodiment illustrated in Fig. 1; and Fig. 5 is a transverse section taken at 5—5 in Fig. 4.

Figure 1:
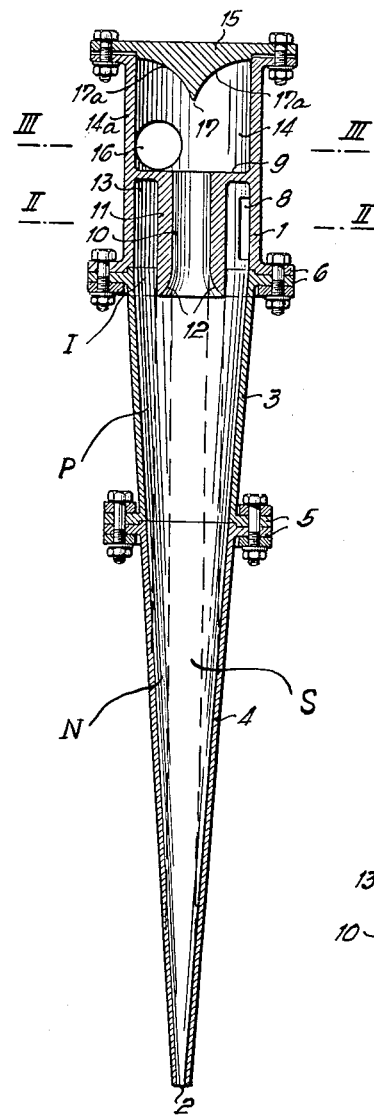
Figure 3:
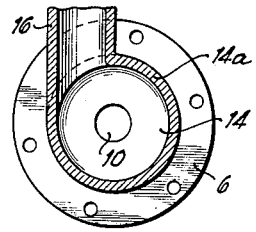
Fig. 3 is a transverse section taken at 3—3 in Fig. 1.
Figure 2:
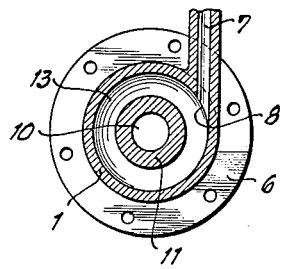
Fig. 2 is a transverse section taken at 2—2 in Fig. 1.

As best shown in Figs. 1–3, a hydrocyclone of the type to which this invention relates consists of an upper cylindrical portion 1 and an adjoining conical portion, shown as made up by sections 3 and 4, terminating at the lower end in an apex 2. The portions 3 and 4 are joined by flanges 5, and the upper portion 3 is similarly joined to the cylindrical portion 1 by means of flanges 6.

The cylindrical portion 1 is provided with an inlet nozzle 7 having a rectangular or oval shaped entering section 8, with a long axis extending in a direction parallel to the longitudinal axis of the unit. The vortex finder tube 11 forming the outlet passage 10 extends inwardly from an annular partition 9, through the cylindrical portion of the unit and terminates at the upper end of the conical portion. The walls of the vortex finder tube 11 are relatively thick and taper outwardly at their inner ends to form a flared inlet 12. The annular chamber 13 defined between the outer surface of the vortex finder tube 11 and the inner surface of the cylindrical chamber portion 1 constitutes the initial whirl space, which includes also the space within the upper portion of the conical member 3 surrounding the outer surface of the vortex finder tube.

The outlet passage 10 of the vortex finder tube 11 leads at its outer end into an upper flow chamber 14 which is closed at the top by a cover plate 15. The cover plate 15 is preferably formed with a central inwardly extending conical extension 17 having walls 17a of concave section. The inwardly extending cone 17 has been found to effect a stabilization of the central column of air within the hydrocyclone. Purified product is withdrawn from the upper chamber through a tangentially extending outlet opening 16. The casing 14a defining the upper chamber 14 is shown as being integral with the upper cylindrical portion 1 and also includes the annular partition 9 and the vortex finder tube 11. These parts may however be formed separately and joined together by appropriate means.

The unit as a whole may be constructed of any of numerous suitable materials, for instance the cylindrical chamber portion 1, upper chamber portion 14a, and cover plate 15 may be formed of a metal, such as steel or brass. The conical portions 3 and 4 are however preferably formed of plastic although metals or other suitable material may be used for them.

The various zones within the hydrocyclone which are interrelated in accordance with this invention are indicated in Fig. 1. The initial whirl space, which surrounds the vortex finder tube 10, is designated I. Immediately below the initial whirl space is the zone within the conical portion of the hydrocyclone and bounded inwardly by an imaginary cylindrical surface extending downwardly from the outer surface of the vortex finder tube 11. This is referred to as the primary whirl space P which contains the downwardly flowing whirling stream as it enters the conical portion of the hydrocyclone. Immediately inwardly from the primary whirl space P is the transition or neutral zone, designated N, which is bounded on the outer side by the imaginary cylindrical extension of the outer surface of the vortex finder tube 11 and bounded at its inner side by an imaginary cylindrical extension of the inner surface of the vortex finder tube 11. The fluid in the neutral zone is largely in a state of transition between the downwardly flowing fluid in the primary zone and the upwardly flowing fluid in the innermost zone herein designated S, and shown as lying within the imaginary cylindrical extension of the inner surface of the vortex finder tube 11.

In general, hydrocyclones of this invention are of such dimensions that the ratio of the volume of the primary zone to each of the other zones is between about 0.6 and 2.5, with the ratio of the total volume of the four zones to the volume of the primary zone between about 2.2 and 6.0.

The relevant dimensions of a hydrocyclone constructed in accordance with this invention are identified in Figs. 4 and 5 and are designated as follows:

$D_{max}$ outer diameter of initial whirl space
$D_{min}$ inner diameter of initial whirl space
$d_v$ inner diameter of vortex finder tube
$l$ length of initial whirl space, also of vortex finder tube
$l_E$ length of inlet opening to initial whirl space
$b_E$ width of inlet opening to initial whirl space
$l_W$ over-all length of chamber
$h$ length of conical portion of chamber
$d_A$ diameter of apex opening Inasmuch as the ratios between the various zones within the hydrocyclone are largely governed by the relationship between the inner and outer diameters of the vortex finder tube 11 and the diameter of the initial whirl chamber 13, the following ratios will generally apply to hydrocyclones of this invention:

$$D_{max}:D_{min}=1.2-2.0$$
$$D_{min}:d_v=1.5-2.4$$

Hydrocyclones useful for separating impurities from paper pulp and constructed in accordance with this invention are typically of dimensions given in the following Table I:

TABLE I

|  | Embodiment A | Embodiment B | Embodiment C | Typical Prior Art Device a |
|---|---|---|---|---|
| $D_{max}$ | 60 | 60 | 250 | 75 |
| $D_{min}$ | 35 | 36 | 175 | 25 |
| $d_v$ | 19 | 19 | 90 | 16 |
| $l$ | 60 | 52 | 250 | 52 |
| $l_W$ | 424 | 424 | 2,000 | 852 |
| $l_E$ | 30 | 30 | 100 | |
| $b_E$ | 6 | 6 | 20 | |
| $d_A$ | pref. 7 | pref. 7 | 20 | varies | a Dimensions given in U.S. Patent No. 2,377,524.

Actual tests comparing the results achieved with the unit described above as Embodiment B and the prior art device described in Table I have been carried out. The relationships between the various zones are shown below in Table II.

TABLE II

|  | Preferred Range | Embodiment B | Embodiment C | Prior Art Device |
|---|---|---|---|---|
| P:I | 0.6–2.5 | 1.27 | 1.66 | 4.2 |
| P:N | 0.6–2.5 | 0.84 | 1.20 | 4.13 |
| P:S | 0.6–2.5 | 1.41 | 1.63 | 5.0 |
| Total:P | 2.2–6.0 | 3.76 | 3.04 | 1.68 |

The comparison runs were carried out on bleached paper pulp having a solids concentration of about 1.0 percent by weight, and an average content of dirt particles of size between 0.5 and 1.0 millimeters, of about 30 points as measured by actual count. Each unit was operated at an inlet pressure of 30 meters of water and an outlet pressure at the outlet for the accepted stock, of 2 meters of water. The dirt content of the accepted product, entrance stock, and rejected material were determined in each case by making up sample sheets of standard size and weight, and counting the number of particles within the designated size range of 0.5–1.0 millimeters. The following results were obtained at various apex nozzle diameters:

TABLE III

| Apex Nozzle dia. mm. | | 100λ | K | Dirt Content, Points | | | S | σ | η |
| --- | --- | --- | --- | --- | --- | --- | --- | --- | --- |
| | | | | Entering | Accepted | Rejected | | | |
| 4.5 | P.A.* | 12.73 | 1.38 | 30 | 7 | 108 | 17.4 | 6.93 | 5.0 |
| | Ex. B | .926 | 2.9 | 29 | 11 | 547 | 2.68 | 67 | 23 |
| 5.0 | P.A.* | 14.0 | 1.36 | 27 | 7 | 122 | 19.0 | 6.54 | 4.7 |
| | Ex. B | 1.96 | 2.61 | 29 | 8 | 386 | 5.12 | 37 | 14.2 |
| 7.0 | P.A.* | 18 | 1.3 | 30 | 6 | 74 | 23.5 | 4.64 | 3.6 |
| | Ex. B | 3.33 | 2.35 | 29 | 6 | 205 | 7.8 | 23 | 9.8 |
| 9.0 | P.A.* | 29.4 | 1.26 | 30 | 5 | 53 | 37.1 | 3.03 | 2.4 |
| | Ex. B | 5.79 | 2.0 | 31 | 5 | 157 | 11.9 | 14.2 | 6.9 |

*Prior art device, as described in Table I.

$K = \dfrac{\text{Total solids concentration of reject, by weight}}{\text{Total solids concentration of entering stock, by weight}}$ $\lambda = \dfrac{\text{Volume of reject per unit time}}{\text{Volume of entering stock per unit time}}$ 100λ = Reject as percent of entering stock, by volume S = Solids in reject as percent of solids in entering stock, by weight $\sigma = \dfrac{\text{Dirt concentration of reject, by weight}}{\text{Dirt concentration of entering stock, by weight}}$ $\eta = \dfrac{\sigma}{K}$, the factor by which the dirt enrichment of the reject exceeds the total substance enrichment of the reject.

Two figures given in Table III of particular significance are σ and η, which indicate respectively the factor by which the dirt concentration in the reject exceeds that of the entering stock, and the factor by which the dirt particle enrichment in the reject exceeds the total solids enrichment in the reject. In each case the figures for the unit embodying the present invention are several-fold higher than those for the prior art device.

The foregoing comparison shows that the hydrocyclone construction of the invention results in a many fold increase in the efficiency of separation over prior devices. The improved results are believed to result partly from the fact that by maintaining the preferred relationship between the volumes and masses of the several zones, better flow conditions are established which minimize turbulence within the unit and consequent remixing of product and waste. If, for instance, the turbulence near the entrance to the vortex finder tube is excessive, a relatively large amount of dirt particles will enter the outgoing stream from the incoming stream in the primary zone. It is believed that turbulence in the vicinity of the initial whirl space and primary zone is minimized by constructing these zones of near equal volume, and therefore dirt particles entering the primary zone tend to be segregated toward the outer wall and away from the outgoing stream within the secondary zone. Fewer particles will thus be near the vortex finder tube to enter the outgoing stream.

The invention also features a relationship between the zones which results in an unusually large neutral zone, which is believed to provide not only better flow conditions and less turbulence, but also a better and more effective separation of the outgoing and incoming streams, such that the amount of dirt particles picked up by the outgoing stream from the incoming stream is greatly reduced.

These effects are described by way of hypothesis, and represent the applicant's understanding of the invention, but it is recognized that other, possibly more accurate, hypotheses may be advanced to explain the results achieved. It is not therefore intended that the invention be limited to any particular mode of operation.

Although the improved operation of hydrocyclones embodying this invention is primarily based on the relationship between the various zones, as described above, other factors that enter into their operation include the elongated tangential inlet opening 8 to the initial whirl space 13, the length of which is desirably 2-8 times the width, and the area of which is preferably from ⅛ to equal the longitudinal cross section of the initial whirl space. The flared inlet 12 to the vortex finder tube 11 is also believed to have a beneficial effect in minimizing turbulence, and the conical projector 17 from the end plate 15 serves to stabilize the central air column and thereby improve the over-all operation of the unit.

This application is a continuation-in-part of U.S. application Serial No. 581,973 filed May 1, 1956.

Having thus disclosed my invention and described in detail a preferred embodiment thereof, I claim and desire to secure by Letters Patent:

1. A hydrocyclone comprising in combination means forming an elongated chamber closed at one end and having an inner surface of circular section, said chamber including a first chamber portion at said one end having a cylindrical inner surface and a tangential inlet opening in said cylindrical surface longer in the axial direction than in the circumferential direction of said first chamber portion; a second chamber having a conical inner surface coaxial with and merging at its base into said cylindrical inner surface, and an outlet opening at the apex of said conical surface; and a vortex finder tube projecting inwardly axially from said one end through said first chamber portion, said vortex finder tube having an axial outlet passage flaring toward the inner end of said tube and an outer cylindrical guide face concentric with the inner surface of said chamber and defining therewith an annular chamber; the interior of said elongated chamber being considered with reference to unbounded zones therein including an initial whirl space within the annular chamber defined between said cylindrical guide face and said inner surface, a primary whirl space between a projected cylindrical extension of said cylindrical guide face and said conical inner surface, a neutral zone between said cylindrical extension of said cylindrical guide face and a projected cylindrical extension of said outlet passage, and a secondary whirl space within said projected cylindrical extension of said outer passage, wherein the ratio of the volume of the primary whirl space to the volume of the initial whirl space is between 0.6 and 2.5, the ratio of the volume of the primary whirl space to the volume of the neutral zone is between 0.6 and 2.5, the ratio of the volume of the primary whirl space to the volume of the secondary whirl space is between 0.6 and 2.5, and the ratio of the total volume of the initial, primary, neutral and secondary zones to the volume of the primary whirl space is between 2.2 and 6.0.

2. A hydrocyclone as defined by claim 1 wherein the ratio of the diameter of the first chamber portion to the diameter of the outer cyclindrical guide face is between 1.2 and 2.0 and the ratio of the diameter of the cylindrical guide face to the diameter of the axial outlet passage is between 1.5 and 2.4.

3. A hydrocyclone as defined by claim 1 wherein the length of the tangential inlet opening in the axial direction is between 2 and 8 times its maximum width.

4. A hydrocyclone as defined by claim 1 wherein the ratio of the diameter of the first chamber portion to the diameter of the cylindrical guide face is between 1.2 and 2.0, the ratio of the diameter of the cylindrical guide face to the diameter of the axial outlet passage is between 1.5 and 2.4, and the length of the tangential inlet opening in the axial direction is between 2 and 8 times its width.

References Cited in the file of this patent

UNITED STATES PATENTS

| | | |
|---|---|---|
| 2,377,524 | Samson | June 5, 1945 |
| 2,757,582 | Freeman | Aug. 7, 1956 |
| 2,765,918 | Fontein | Oct. 9, 1956 |
| 2,835,387 | Fontein | May 20, 1958 |